Patented Apr. 14, 1931

1,800,828

UNITED STATES PATENT OFFICE

WILLIAM H. FURNESS, OF NATIONAL PARK, NEW JERSEY, ASSIGNOR TO CELLOCILK COMPANY, OF PHILADELPHIA, PENNSYLVANIA, A CORPORATION OF DELAWARE

METHOD OF MAKING COPPER HYDROXIDE

No Drawing. Application filed September 15, 1925. Serial No. 56,553.

This invention relates to an improved method of making copper hydroxide and certain other improvements I have discovered in developing said method, and which will appear hereinafter.

Copper hydroxide is used extensively in the artificial silk industry, but the commercial copper hydroxide available is impure. It is highly advantageous to have pure copper hydroxide to dissolve the cotton employed in the manufacture of artificial silk. If it is impure the solution is unstable, and the silk is very difficult to spin.

It is one of the primary objects of my invention to overcome the foregoing difficulties and to produce a pure copper hydroxide economically and quickly.

In carrying out my invention I prefer to proceed as follows, with the preferred percentages given:

I prepare a solution of copper sulphate, using 500 grams $CuSO_4.5H_2O$ in two liters of water ($H_2O$).

To this I add sufficiently strong aqueous ammonia to bring the copper in solution as cupro ammonium sulphate—$Cu(NH_3)_4SO_4$. About 500 cc., 26 degree B., ammonia is sufficient for this purpose. Inasmuch as commercial copper sulphate usually contains iron as an impurity, the solution is filtered at this point to remove this iron which has been precipitated by the ammonia.

To the filtered solution I add caustic soda in an amount preferably only slightly larger than the theoretical requirement—say 160 grams. This I add, preferably in concentrated solution, so as to precipitate $Cu(OH)_2$. I then remove the precipitate by filtration or other means.

The remaining filtrate now contains $NH_3$ equal to the amount originally added and, with the exception of a small portion, in a free state. There is also present $Na_2SO_4$, formed as a by-product of the precipitation. A small amount of copper also remains in solution, presumably in the form of cupro ammonium sulphate.

I now add 500 grams of $CuSO_4.5H_2O$ (this time in the solid state) to the filtrate and stir. This combines with free $NH_3$ to again form a solution of cupro ammonium sulphate. A little more $NH_3$ may have to be added to make up for incidental losses due to slight evaporation and the like. This solution is filtered to remove iron as before.

I now repeat precipitation with caustic soda as before, and again filter or otherwise remove the $Cu(OH)_2$. To the resultant filtrate I again add 500 grams $CuSO_4.5H_2O$ in the solid state and bring it into solution as set forth, and filter out iron.

I then again precipitate with caustic soda as described and filter.

By this time the filtrate contains three times as much $Na_2SO_4$ as the first filtrate and concentration is sufficiently high that a large portion may be crystallized out in the form of $Na_2SO_4.10H_2O$, by cooling. This not only removes the by-product of the process, but it removes a large quantity of water in the form of water of crystallization.

The crystals are separated by filtration, centrifuging or otherwise.

A cycle is now established and may be repeated indefinitely, separating in each cycle $Cu(OH)_2$ and $Na_2SO_4.10H_2O$, and removing the iron present as an impurity in the copper sulphate added.

A balance may be established so that the $H_2O$ removed in the $Cu(OH)_2$ and the $Na_2SO_4.10H_2O$ is practically equal to the amount of $H_2O$ added in the $CuSO_4.5H_2O$ crystals, the NaOH solution and the wash water, if any, used to wash the precipitate and crystals, thus maintaining a uniform volume.

It will thus be seen that the original quantity of ammonia can be used over and over again, with a negligible loss. The only materials used in each batch are the copper sulphate and the equivalent amount of caustic soda.

It will thus be seen that the process is very inexpensive and exceedingly simple after the filtrate has once been brought to the proper condition to permit the cycling operation. The copper hydroxide produced is pure, and I am thus enabled to produce superior artificial silk.

It will be understood that the above process may be so conducted that the volume of solution may be, at will, increased, decreased or kept constant, depending on the relation between the amount of water added in the $CuSO_4.5H_2O$, the NaOH solution and the wash water, as compared with the amount removed in the $Na_2SO_4.10H_2O$ crystals and the $Cu(OH)_2$. If for any reason it should be desirable to decrease the volume more than is accomplished by the step of crystallization, this may be done by dissolving in the solution anhydrous sodium sulphate, and crystallizing it out in the form of $Na_2SO_4.10H_2O$.

This method of removing water from a solution as water of crystallization has a wide application inasmuch as it may be employed where the usual method of removing water by evaporation may be detrimental. For instance the heat of boiling at atmospheric pressures may cause undesirable reactions and the use of vacuum may cause loss of volatile substances. It will be understood that the process is not limited to sodium sulphate, but that other materials containing water of crystallization may be used.

While the process as above described is the preferred and most economical method of carrying on my invention, I am not limited to the proportions given above, nor to the chemical compounds mentioned above. It is obvious that copper compounds other than the sulphate may be used and that other alkalis may be substituted for the caustic soda. If the salt formed as a by-product crystallizes with insufficient water of crystallization to keep the solution from increasing in volume, this may be remedied by adding the copper salt and the alkali to the solution in an anhydrous condition.

I claim:—

1. The method of repeatedly producing copper hydroxide using the same body of aqueous ammonia, which consists in bringing copper sulphate into solution with aqueous ammonia, in adding caustic soda, in removing the resulting copper hydroxide, in dissolving more copper sulphate in the ammonia solution, and repeating the process until the concentration of $Na_2SO_4$ is such that an amount thereof may be crystallized out in the form of $Na_2SO_4.10H_2O$ so as to make the amount of $H_2O$ removed in the $Cu(OH)_2$ and the $Na_2SO_4.10H_2O$ substantially equal to the amount of $H_2O$ added in the $CuSO_4.5H_2O$ and the NaOH solution used to wash the precipitate and crystals; and thereafter in dissolving more copper sulphate in the ammoniacal filtrate, in adding caustic soda, and in removing the resulting copper hydroxide and sodium sulphate, these latter steps being then repeated indefinitely with such make-up being added as may be needed.

2. The method of repeatedly producing copper hydroxide using the same body of aqueous ammonia, which consists in bringing copper sulphate into solution with aqueous ammonia, in adding caustic soda, in removing the resulting copper hydroxide and dissolving more copper sulphate in the ammonia solution, and repeating the process until the liquor contains about three times as much $Na_2SO_4$ as the first filtrate, in then removing a substantial portion of the $Na_2SO_4$ as decahydrate; after which more copper sulphate is dissolved in the filtrate, caustic soda added and the resulting copper hydroxide and sodium sulphate removed ad infinitum with the addition of such make-up as may be needed.

3. The method of producing copper hydroxide which consists in employing a chemical cycle which includes adding copper sulphate to ammonia water, filtering the $Fe(OH)_3$ impurity precipitated, adding caustic soda to the filtrate in quantities sufficient to precipitate $Cu(OH)_2$, removing the copper hydroxide, separating the resulting sodium sulphate as decahydrate, and treating the ammoniacal filtrate with additional copper sulphate to repeat the cycle.

4. The method of repeatedly producing copper hydroxide using the same body of aqueous ammonia, which consists in employing a chemical cycle which includes adding copper sulphate to ammonia water, filtering the $Fe(OH)_3$ impurity precipitated, adding caustic soda in sufficient quantities to the filtrate to precipitate $Cu(OH)_2$, removing the copper hydroxide, separating the resulting sodium sulphate with water of crystallization in a form such that the water removed by the sodium sulphate and $Cu(OH)_2$ is approximately equal to the water added in the copper sulphate and caustic soda solution, and treating the ammoniacal filtrate with additional copper sulphate to repeat the cycle.

5. The method of repeatedly producing copper hydroxide, using the same body of aqueous ammonia, which consists in bringing copper sulphate in solution with ammonia, in adding caustic soda, in removing the resulting copper hydroxide and sodium sulphate, and dissolving more copper sulphate in the ammonia solution, and repeating the process.

In testimony whereof, I have hereunto signed my name.

W. H. FURNESS.